(12) United States Patent
Jeong et al.

(10) Patent No.: US 8,938,172 B2
(45) Date of Patent: Jan. 20, 2015

(54) VISIBLE LIGHT COMMUNICATION METHOD AND APPARATUS

(71) Applicant: Electronics and Telecommunications Research Institute, Daejeon (KR)

(72) Inventors: Jin-Doo Jeong, Daejeon (KR); Tae-Gyu Kang, Daejeon (KR); Sang-Kyu Lim, Daejeon (KR); Il-Soon Jang, Daejeon (KR); Dae-Ho Kim, Daejeon (KR); You-Jin Kim, Daejeon (KR); Seong-Hee Park, Daejeon (KR); In-Su Kim, Daejeon (KR); Hyun-Jong Kim, Cheongju-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 45 days.

(21) Appl. No.: 13/919,140

(22) Filed: Jun. 17, 2013

(65) Prior Publication Data

US 2014/0010540 A1 Jan. 9, 2014

(30) Foreign Application Priority Data

Jul. 9, 2012 (KR) .......................... 10-2012-0074330

(51) Int. Cl.
*H04B 10/00* (2013.01)
*H04B 10/04* (2006.01)
*H04B 10/116* (2013.01)

(52) U.S. Cl.
CPC .................................. *H04B 10/116* (2013.01)
USPC ............................. 398/172; 398/135; 398/189

(58) Field of Classification Search
USPC ............... 398/25, 66–68, 135–137, 172, 183, 398/189, 190
See application file for complete search history.

(56) References Cited

U.S. PATENT DOCUMENTS

| 7,359,994 | B1 * | 4/2008 | Lakhanpal et al. | 710/5 |
| 7,668,467 | B2 * | 2/2010 | Naoe et al. | 398/202 |
| 2010/0135669 | A1 | 6/2010 | Kim et al. | |

(Continued)

FOREIGN PATENT DOCUMENTS

KR 1020100060900 A 6/2010

OTHER PUBLICATIONS

S.K. Lim et al., Technology Trends of Visible Light Communication Coupled with LED Illumination, Electronics and Telecommunications Trends, Aug. 2010, pp. 38-47, vol. 25, No. 4.

(Continued)

*Primary Examiner* — Dalzid Singh
(74) *Attorney, Agent, or Firm* — William Park & Associates Patent Ltd.

(57) ABSTRACT

Disclosed herein are a visible light communication method and apparatus. The visible light communication method includes determining whether a current location is the start of a symbol of a transmission signal, setting a sample index, a signal accumulated value for an accumulation region of a front half portion of the symbol, and a signal accumulated value for an accumulation region of a rear half portion of the symbol, determining whether the sample index belongs to an accumulation region of the front or rear half portion of the symbol, and accumulating samples of the transmission signal in accordance with the location to which the sample index belongs, determining whether a current location corresponds to the end of the symbol, and outputting a Variable Pulse Position Modulation (VPPM) communication signal corresponding to the transmission signal.

16 Claims, 13 Drawing Sheets

(56) References Cited

U.S. PATENT DOCUMENTS

| | | | |
|---|---|---|---|
| 2010/0327764 A1* | 12/2010 | Knapp | 315/250 |
| 2012/0230696 A1* | 9/2012 | Pederson et al. | 398/115 |
| 2012/0281987 A1* | 11/2012 | Schenk et al. | 398/118 |
| 2013/0336662 A1* | 12/2013 | Murayama et al. | 398/130 |

OTHER PUBLICATIONS

Kwonhyung Lee et al., Modulations for Visible Light Communications With Dimming Control, IEEE Photonics Technology Letters, Aug. 15, 2011, pp. 1136-1138, vol. 23, No. 16.

* cited by examiner

VISIBLE LIGHT COMMUNICATION METHOD AND APPARATUS

CROSS REFERENCE TO RELATED APPLICATION

This application claims the benefit of Korean Patent Application No. 10-2012-0074330, filed on Jul. 9, 2012, which is hereby incorporated by reference in its entirety into this application.

BACKGROUND OF THE INVENTION

1. Technical Field

The present invention relates generally to a visible light communication method and apparatus and, more particularly, to modulation and demodulation technology for the transmission and reception of visible light communication (VLC) that is capable of supporting the dimming function of controlling the brightness of light-emitting diode (LED) lighting in visible light communication.

2. Description of the Related Art

Recently, due to abrupt changes in the environment that require reductions in the consumption of energy and the production of greenhouse gas, lighting equipment and display devices using LEDs have rapidly spread and have a lot of uses in daily life, such as in automobiles, signal lights, signboards, TV, monitors, mobile devices, special lighting, and general lighting. Furthermore, research has been actively carried out into wireless communication technology that attempts to combine both the intrinsic purpose of LED light sources and the purpose of communication means by adding communication functionality to LED lighting equipment or LED display devices.

LED light sources are widely used because they have the advantages of having longer life spans than existing light sources, having superior power efficiency, enabling various colors to be implemented, and allowing digital control. Furthermore, with the enactment of the Kyoto Protocol to the United Nations Framework Convention on Climate Change, it became necessary to reduce the consumption of energy and the production of greenhouse gas, and this is one of the reasons why various countries over the world are rapidly replacing existing light sources with LED light sources.

Visible light communication technology is wireless communication technology that wirelessly transfers information using light in the visible wavelength band, which can be perceived by the eyes of humans. This technology is distinguished from existing wired optical communication technology in that the former technology utilizes light in the visible wavelength band.

Furthermore, unlike Radio Frequency (RF) wireless communication technology currently being widely used, visible light communication technology has the convenience of freely using corresponding frequencies without restriction or permission, provides superior physical security, and has the advantage of enabling a user to perceive a communication link with his or her eyes. In particular, visible light communication technology is convergence technology that is capable of achieving both the intrinsic purpose of light sources and communication functionality.

Since a visible light communication system is a system that transmits and receives information based on a visible light, wireless communication should be performed in the state in which the basic functions of lighting have been fulfilled. One of the basic functions of lighting is the function of controlling the brightness of lighting, that is, a dimming function, and thus a visible light communication system should support both the function of performing wireless communication using visible light and a dimming function. Technologies that have been proposed to control the brightness of lighting in connection with visible light communication include an amplitude dimming method and a variable-pulse position modulation (VPPM) dimming method.

Amplitude dimming is a method of controlling the brightness of a light source by changing the amplitude of a signal in an On Off Keying (OOK) modulation method, and VPPM dimming is a method of providing the function of controlling brightness using a VPPM modulation method.

As described above, amplitude dimming is a method of controlling the brightness of a light source by changing the amplitude of a signal in an OOK modulation method. FIGS. 1 to 3 illustrate an amplitude dimming method when Manchester code and an OOK modulation method have been employed.

FIG. 1 illustrates an optical waveform output from an LED light and a corresponding average output when Manchester-OOK technology has been applied to a transmission unit. This indicates that the average output is the same as an optical output that is generated when a Direct Current (DC) signal having an amplitude equal to ½ of the amplitude $P_M$ of a Manchester-OOK signal is applied.

Meanwhile, FIG. 2 shows that the average output of an LED light source can be increased by operating the LED light source so that the amplitude $P_{M1}$ of a Manchester-OOK signal is wider than the signal amplitude $P_M$ of FIG. 1. Similarly, the average output can be decreased by operating the LED light source so that the amplitude of a signal is narrow.

Furthermore, FIG. 3 shows that although the amplitude $P_{M2}$ of a Manchester-OOK signal is the same as the signal amplitude $P_M$ of FIG. 1, an average output can be increased as a result by applying a DC offset. However, in practice, it is difficult for such amplitude dimming technology to fulfill the maximum brightness level that is provided by an LED light having no visible light communication function and having the same specifications. The reason for this is that a signal having an amplitude significantly above the allowable range of an LED light source should be applied, in which case applied instantaneous signal amplitudes may damage an LED light source, which results in a significant reduction in the life span of the LED light source in the long term. Furthermore, controlling brightness by changing the amplitude of a signal means that the intensity of current to be supplied to an LED light source is changed in response to the control of brightness, with the result that amplitude dimming has the possibility of causing color variation in the LED light source.

A VPPM modulation method is a modulation method that was devised from a double pulse position modulation (2-PPM) modulation method and a pulse width modulation (PWM) modulation method in order to prevent flickering from occurring inside a frame and to control the brightness of a light source, and is one of the modulation methods for visible light communication that were adopted in the IEEE 802.15.7 international standard.

A 2-PPM modulation method is a modulation method that represents bit 0 and bit 1 according to the locations of pulses, as illustrated in FIG. 4, and provides the same average brightness for both bit 1 and bit 0, as in the optical output of Manchester code. Accordingly, this technology can prevent flickering from occurring inside a frame.

Meanwhile, a PWM modulation method is a modulation method that controls the brightness of a light source by changing the widths of pulses, as illustrated in FIG. 2, and is currently being widely used in LED lighting.

Meanwhile, a VPPM modulation method is similar to a 2-PPM modulation method in that bit 0 and bit 1 are represented according to the locations of pulses, and is similar to a PWM modulation method in that the widths of pulses can be changed in accordance with brightness desired by a user.

Therefore, an optical waveform having a pulse width of 50%, which is modulated using variable-PPM technology, is the same as a 2-PPM modulation waveform, as illustrated in FIG. 5.

Furthermore, FIG. 5 illustrates a mechanism for controlling brightness using a VPPM modulation method, and illustrates an example in which when a digital signal of 001 is modulated using a variable-PPM technology, even the same data exhibits brightness that varies in response to a change in pulse width.

In addition, VPPM technology subdivides each change in pulse width into smaller increments, and thus can provide brightness similar to the maximum brightness that is provided by an LED light having the same specifications.

Furthermore, brightness is controlled by pulse widths along a time axis, rather than the amplitudes of pulses. Therefore, an LED light source may not be damaged and color variation in the light source may not also occur.

Korean Patent Application Publication No. 2010-0060900 discloses a method for enabling visible light communication without deteriorating the function of controlling the luminance of lighting in a lighting device using LEDs. However, the technology disclosed in this Korean patent application publication is defective in that errors occur due to interference between signals that are received during visible light communication.

As a result, there is a pressing need for new technology for visible light communication.

SUMMARY OF THE INVENTION

Accordingly, the present invention has been made keeping in mind the above problems occurring in the prior art, and an object of the present invention is to provide a transmission and reception communication method and apparatus that enables VPPM modulation technology capable of supporting dimming functionality to be implemented as a digital circuit while taking into consideration sampling and a counter.

In accordance with an aspect of the present invention, there is provided a visible light communication method, including determining whether a current location is a start of a symbol of a transmission signal by comparing the symbol of the transmission signal with a symbol clock synchronized with the symbol; setting a sample index, indicative of a sequential position number of each of samples obtained by sampling the symbol of the transmission signal at intervals of a predetermined frequency, a signal accumulated value for an accumulation region of a front half portion of the symbol, and a signal accumulated value for an accumulation region of a rear half portion of the symbol, based on results of the determination of whether the current location is the start of the symbol of the transmission signal; determining whether the sample index belongs to an accumulation region of the front or rear half portion of the symbol by comparing the sample index with a midpoint of the symbol of the transmission signal, and accumulating samples of the transmission signal in accordance with the location to which the sample index belongs; determining whether a current location corresponds to an end of the symbol by determining whether the sample index is identical to a per-symbol sample index; and outputting a Variable Pulse Position Modulation (VPPM) communication signal corresponding to the transmission signal based on results of the determination of whether the current location corresponds to the end of the symbol.

The transmission signal may be an analog signal that is formed of visible light, and the VPPM communication signal may be a digital signal that is formed by demodulating the transmission signal to a value of 0 or 1.

The VPPM communication signal may be a 2-PPM signal in which locations of pulses are two in number within the symbol, and the midpoint may correspond to the 2-PPM signal.

The visible light communication method may further include increasing a sequential position number of the sample index and repeating the above steps for a subsequent sample index.

The synchronized symbol clock may be obtained via a timing synchronization circuit or a clock recovery circuit.

Setting the sample index, the signal accumulated value for the accumulation region of the front half portion of the symbol, and the signal accumulated value for the accumulation region of the rear half portion of the symbol may include, if it is determined that the current location corresponds to the start of the symbol, the sample index, the signal accumulated value for the accumulation region of the front half portion of the symbol, and the signal accumulated value for the accumulation region of the rear half portion of the symbol are reset to 0.

Outputting the VPPM communication signal corresponding to the transmission signal based on the results of the determination of whether the current location corresponds to the end of the symbol may include, if it is determined the current location corresponds to the end of the symbol, comparing the signal accumulated value for the front half portion of the inside of the symbol with the signal accumulated value for the rear half portion of the inside of the symbol, and outputting the VPPM communication signal.

A symbol of the VPPM communication signal may be delayed by at least one symbol compared with the symbol of the transmission signal.

Determining whether the sample index belongs to the accumulation region of the front or rear half portion of the symbol by comparing the sample index with the midpoint of the symbol of the transmission signal, and accumulating the samples of the transmission signal in accordance with the location to which the sample index belongs may include selecting one of the accumulation region for the front half portion of an inside of the symbol and the accumulation region for the rear half portion of the inside of the symbol by comparing the sample index with the midpoint of the symbol; determining whether to perform accumulation by comparing the sample index with a number of accumulated samples of the selected accumulation region; and accumulating a received signal depending on results of the determination.

A width of the accumulation region of the front or rear half portion of the inside of the symbol may be set to a value smaller than half of the symbol, and only specific front and rear portions of the symbol of the transmission signal may be accumulated.

In accordance with another aspect of the present invention, there is provided a visible light communication apparatus, including a counter configured to generate samples by sampling a transmission signal at intervals of a predetermined frequency, and to generate a sample index indicative of a sequential position number of a current one of the samples; a transient point setting unit configured to set a transient point of a modulated signal sample, indicating a sample index at which a value of the transmission signal varies; a first comparator configured to determine whether the sample index belongs to a front or rear half portion of a symbol of the transmission signal; a first accumulator configured to accumulate a transmission signal of the front half portion of the symbol; a second accumulator configured to accumulate a transmission signal of the rear half portion of the symbol; a demultiplexer configured to distribute the transmission signal to the first accumulator or second accumulator in accordance with comparison results of the first comparator; and a communication signal determination unit configured to determine a VPPM communication signal of the transmission signal by comparing magnitudes of the transmission signals accumulated in the first accumulator and the second accumulator.

The counter may increase a sequential position number of the sample index, and transfer the increased sequential position number to the comparator.

The first comparator may determine whether the sample index belongs to a front or rear half portion of the symbol by comparing the sample index with half of a number of per-symbol samples of the transmission signal.

The visible light communication apparatus may further include a second comparator configured to determine whether a current location corresponds to an end of the symbol by determining whether the sample index is identical to a per-symbol sample index of the transmission signal; wherein the communication signal determination unit outputs the VPPM communication signal if the second comparator determines that the current location corresponds to the end of the symbol.

The visible light communication apparatus may further include a second comparator configured to select one of front and rear half portions of an inside of the symbol as a portion where the transmission signal will be accumulated by comparing the sample index with a midpoint of the symbol; and a third comparator configured to determine whether to perform accumulation by comparing the sample index with a number of accumulated samples of the portion where the transmission signal will be accumulated.

A width of an accumulation region of the front or rear half portion of an inside of the symbol may be set to a value smaller than half of the symbol, and only specific front and rear portions of the symbol of the transmission signal may be accumulated.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
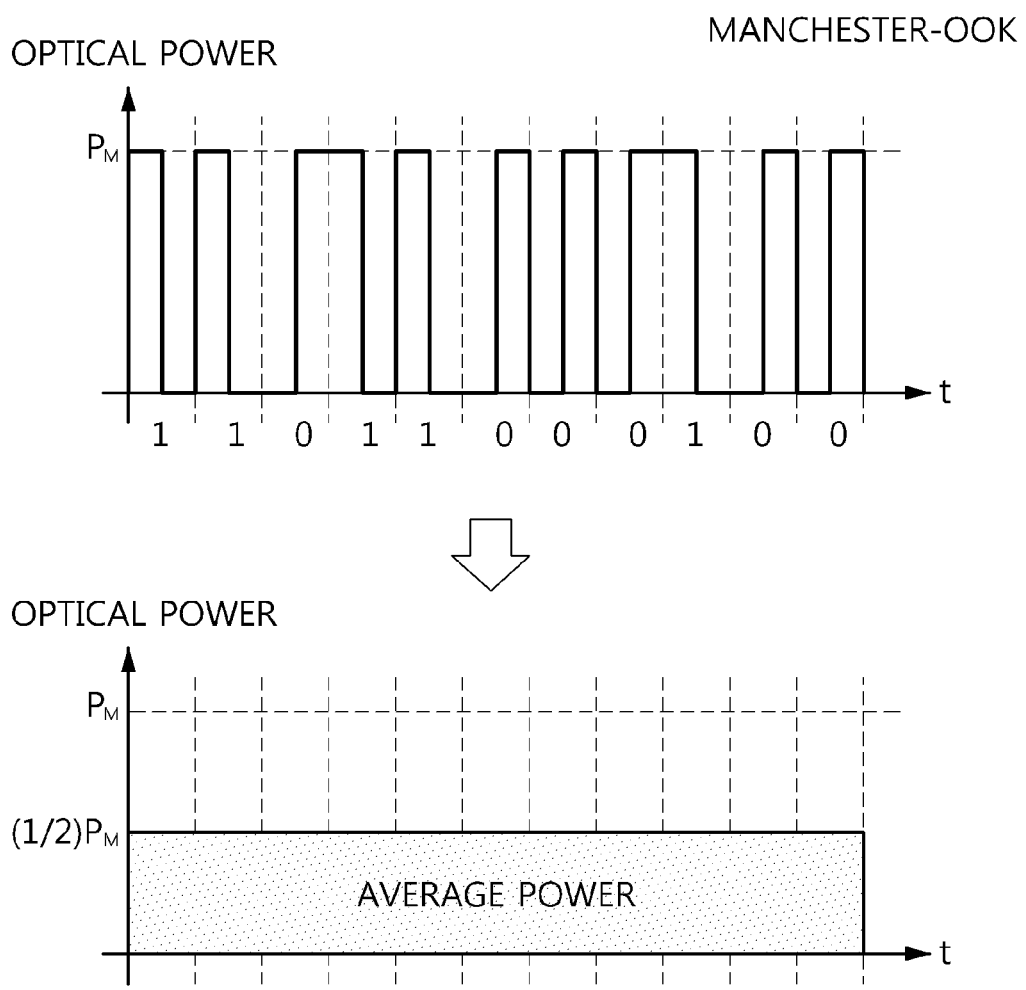
FIG. 1 is a diagram illustrating an amplitude dimming waveform in a Manchester-OOK environment.
Figure 2:
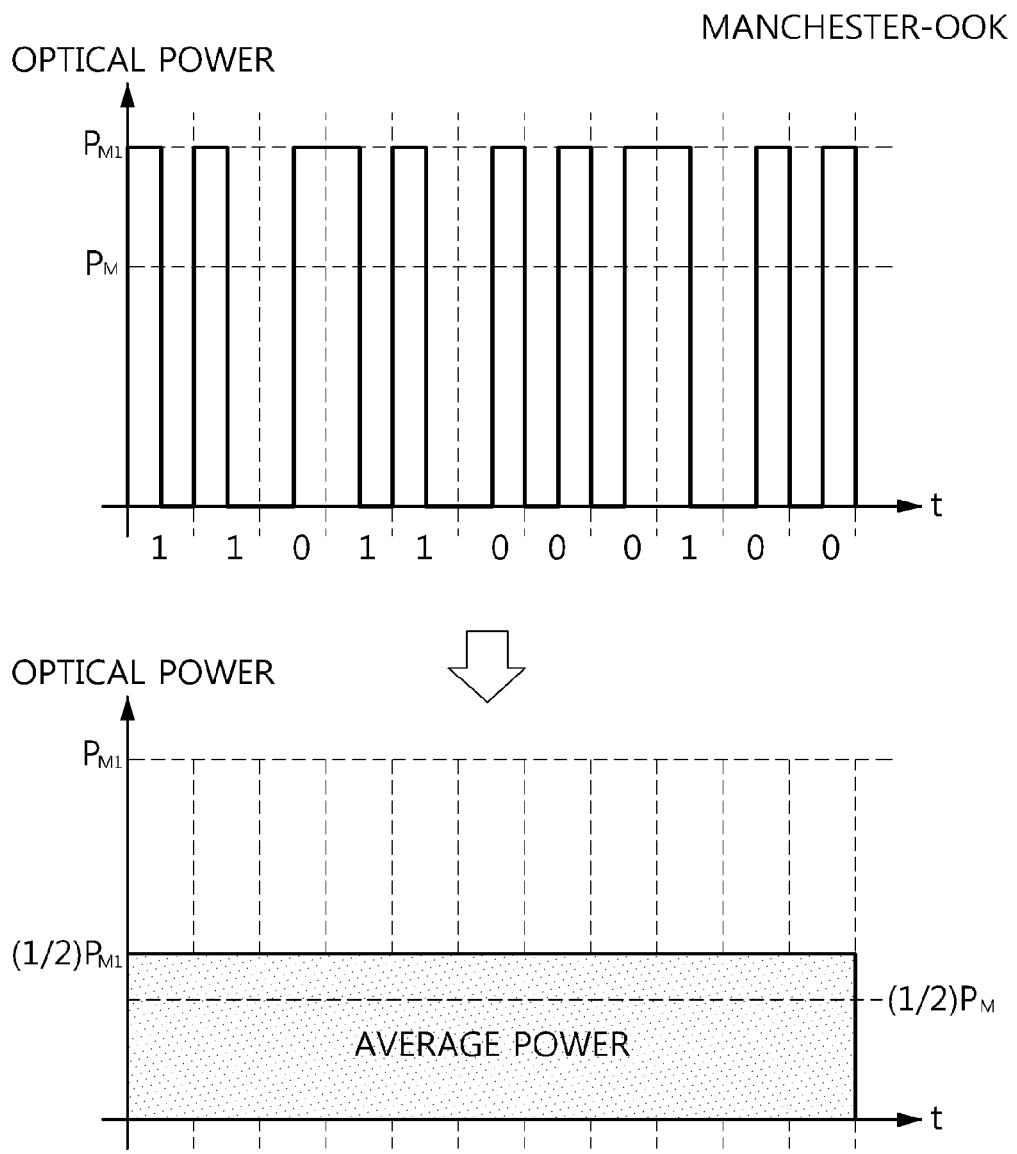
FIG. 2 is a diagram illustrating an amplitude dimming waveform in a Manchester-OOK environment.
Figure 3:
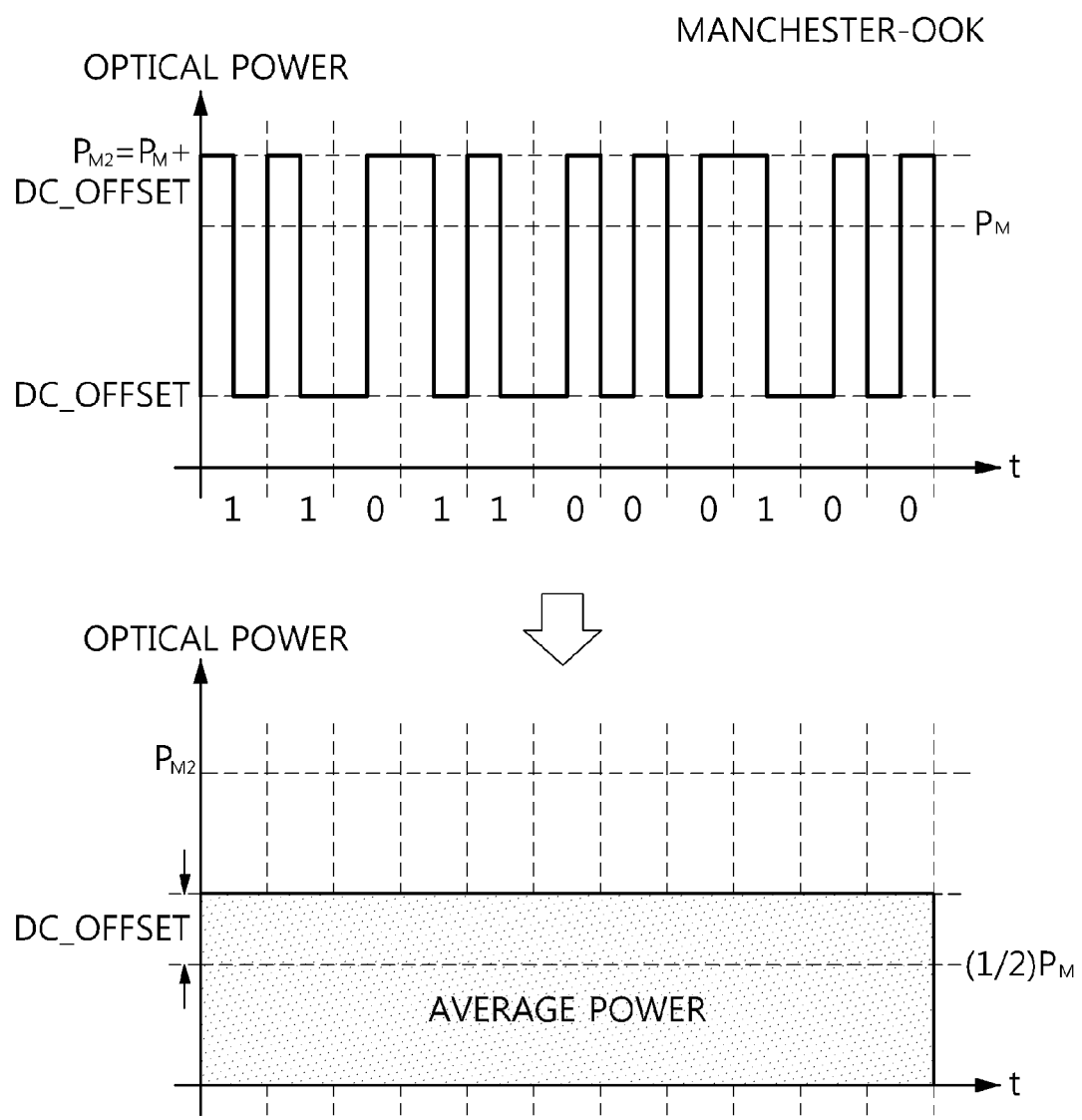
FIG. 3 is a diagram illustrating an amplitude dimming waveform in a Manchester-OOK environment.
Figure 4:
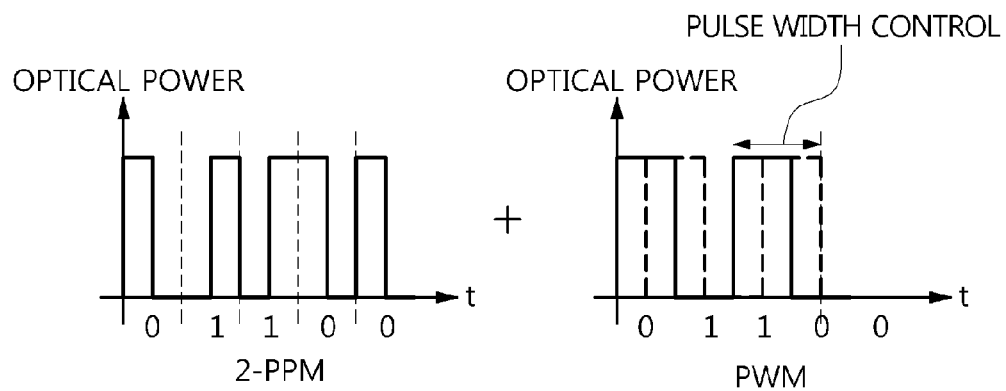
FIG. 4 is a diagram illustrating 2-PPM and PWM modulated waveforms on which a VPPM modulation method is based.
Figure 5:
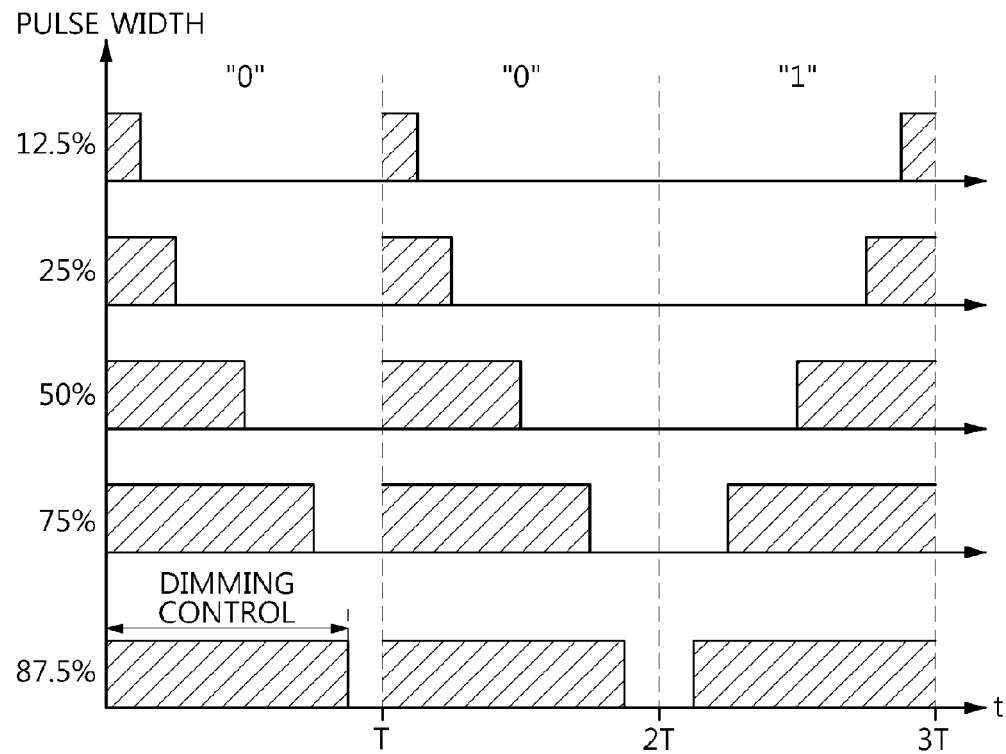
FIG. 5 is a diagram illustrating a VPPM modulation waveform that supports the function of controlling brightness in accordance with a change in pulse width.

The present invention will be described in detail below with reference to the accompanying drawings. Repeated descriptions and descriptions of known functions and configurations which have been deemed to make the gist of the present invention unnecessarily vague will be omitted below. The embodiments of the present invention are intended to fully describe the present invention to a person having ordinary knowledge in the art. Accordingly, the shapes, sizes, etc. of elements in the drawings may be exaggerated to make the description clear.

Embodiments in accordance with the present invention will be described in detail with reference to the accompanying drawings.

A modulated signal or a demodulated signal is a type of communication signal that is output as a digital value via a Variable Pulse Position Modulation (VPPM) method.

Figure 6:
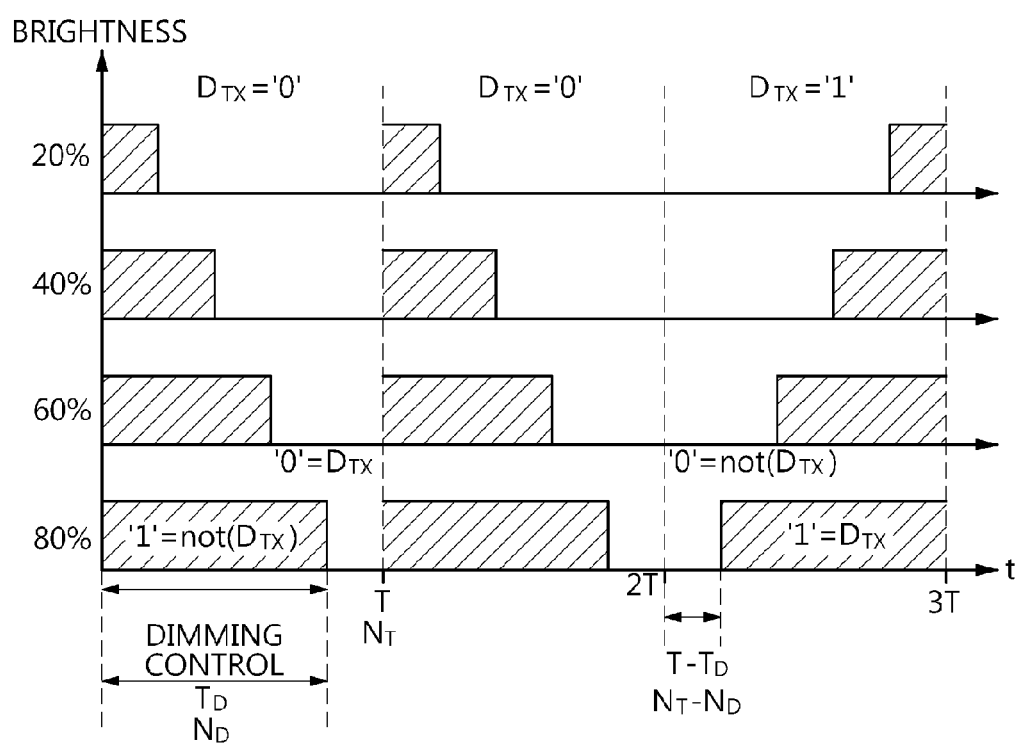
FIG. 6 is a diagram illustrating the relationships between dimming control, a transmission signal, sampling, and a modulated signal with respect to a VPPM modulation waveform in accordance with an embodiment of the present invention.

FIG. 6 is a diagram illustrating the relationships between dimming control, a transmission signal, sampling, and a modulated signal with respect to a VPPM modulation waveform in accordance with an embodiment of the present invention.

A digital circuit that processes a digital signal that belongs to a discrete time domain is triggered by a clock of a specific frequency, and is then operated. This means that a signal sampled at a specific frequency is signal-processed via a digital circuit.

In order to implement a VPPM transmission and reception apparatus as a digital circuit, the sampling of VPPM signals should be taken into consideration. In FIG. 6, $D_{TX}$ denotes the bit information that is transmitted via a single VPPM modulated symbol, T denotes the symbol time, and $T_D$ denotes the VPPM pulse width that varies in response to a dimming control signal.

In this case, the VPPM symbol frequency is 1/T Hz. Furthermore, if a dimming percentage value to be set is $\text{Dim}_{per}$ [%], $T_D = T \cdot \text{Dim}_{per}/100$.

When a VPPM symbol is sampled using a clock of frequency $N_T/T$ Hz that is $N_T$ times higher than VPPM symbol frequency 1/T Hz, a single VPPM symbol includes $N_T$ samples.

Therefore, the number of samples $N_D$ of the VPPM pulse width related to brightness becomes $\text{round}(T_D/T \cdot N_T)$. Here, the term "round" denotes a round-off operation. If the number of cases of dimming resolution, that is, the degree of brightness control, in a single symbol is a divisor of $N_T$, $N_D = T_D/T \cdot N_T$ is obtained without requiring a round-off operation.

If a modulated signal output through VPPM modulation is $S_{VPPM\_TX}$, $S_{VPPM\_TX}=1$ (logical high) in the interval from the start of the symbol to a $N_D$-th sample, and $S_{VPPM\_TX}=0$ (logical low) in the interval therefrom to the end of the symbol, with respect to transmission signal $D_{TX}=0$ in FIG. 6.

In the case of transmission signal $D_{TX}=1$, $S_{VPPM\_TX}=0$ in the interval from the start of the symbol to an $(N-N_D)$-th sample, and $S_{VPPM\_TX}=1$ in the interval therefrom to the end of the symbol. If a sample index for a transient point of the modulated signal at which the value of the modulated signal $S_{VPPM\_TX}$ varies is $N_T P$, $N_T P = N_D$ with respect to $D_{TX}=0$, and $N_T P = N - N_D$ with respect to $D_{TX}=1$.

Furthermore, FIG. 6 also illustrates the relationship between the modulated signal $S_{VPPM\_TX}$ and the transmission signal $D_{TX}$. Prior to the transient point $N_T P$ of the modulated signal, the relationship between the modulated signal $S_{VPPM\_TX}$ and the transmission signal $D_{TX}$ have a logically inverted relationship, that is, $S_{VPPM\_TX}=\text{not}(D_{TX})$.

In contrast, after $N_T P$, they have a logically identical relationship, that is, $S_{VPPM\_TX}=D_{TX}$.

Based on this relationship between the dimming control signal $\text{Dim}_{per}$ (or $N_D$), the transmission signal $D_{TX}$, sampling and the modulated signal $S_{VPPM\_TX}$, digital signal processing related to VPPM modulation may be performed.

Figure 7:
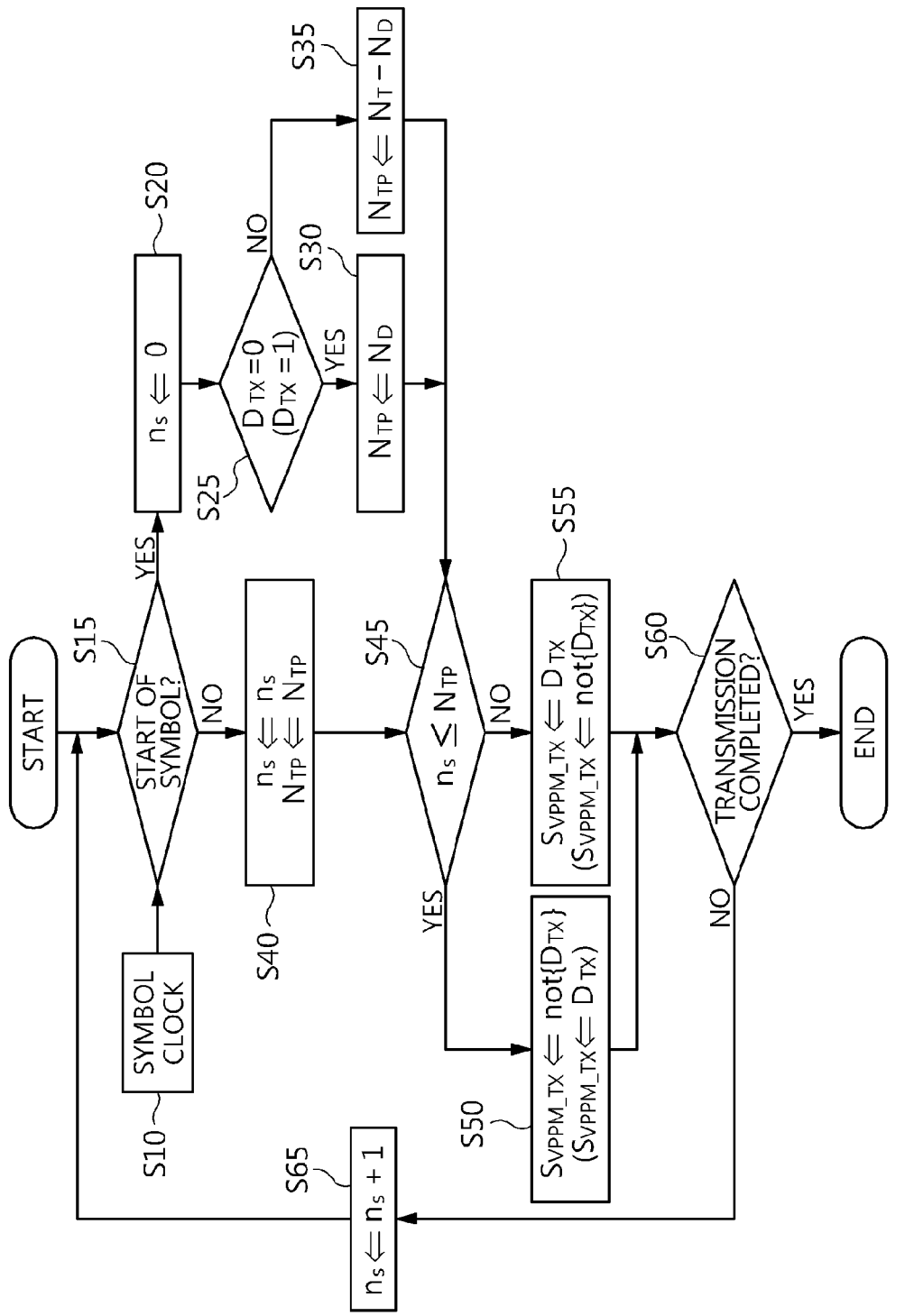
FIG. 7 is a flowchart illustrating the signal processing of the VPPM modulation of a visible light communication method in accordance with an embodiment of the present invention.

FIG. 7 is a flowchart illustrating the signal processing of the VPPM modulation of a visible light communication method in accordance with an embodiment of the present invention.

FIG. 7 illustrates the flow of a signal processing process of, when the transmission signal $D_{TX}$ is 001, generating the VPPM modulated signal $S_{VPPM\_TX}$ corresponding to the dimming control signal $\text{Dim}_{per}$ (or $N_D$) and the transmission signal $D_{TX}$ while taking into consideration sampling and the counter, with respect to the VPPM modulation waveform illustrated in FIG. 6.

$n_s$ is a count value for a current sample, that is, a sample index, which is the sequential position number of each of samples that are obtained by sampling a symbol at intervals of a predetermined frequency.

Referring to FIG. 7, in a visible light communication method in accordance with an embodiment of the present invention, first, a symbol clock synchronized with a transmission signal is input at step S10, and whether a current location corresponds to the start of a corresponding symbol is determined by comparing the synchronized symbol clock with the symbol being sampled based on the symbol clock synchronized with the transmission signal at step S15.

In this case, at step S10, a sample clock that is used to distinguish a sample index may be input along with the symbol clock.

The symbol clock refers to a clock that is used to distinguish a symbol in a transmission signal, whereas the sample clock refers to a clock that is used to distinguish each of the samples that are sampled in regular intervals within a single symbol of a transmission signal.

Thereafter, if it is determined that a current location corresponds to the start of the symbol, the sample index $n_s$ is reset to 0 at step S20, and a transient point $N_T P$ of the modulated signal is set in accordance with the transmission signal $D_{TX}$.

Here, the transient point $N_T P$ of the modulated signal is set by determining whether the value of the transmission signal $D_{TX}$ is 0 or 1.

If it is determined at step S25 that the value of the transmission signal $D_{TX}$ is 0, the number of samples $N_D$ of the VPPM pulse width is set as the transient point of the modulated signal at step S30. In contrast, if it is determined that the value of the transmission signal $D_{TX}$ is not 0, the difference between the number of samples $N_T$ of a single VPPM symbol and the number of samples $N_D$ of the VPPM pulse width is set as the transient point of the modulated signal at step S35.

In contrast, if it is determined at step S15 that a current location corresponds to the midpoint of the symbol, the current sample index $n_s$ and the transient point $N_T P$ of the modulated signal are maintained without change at step S40

Thereafter, whether the location of the current sample index $n_s$ corresponds to a point before and after the transient point $N_T P$ of the modulated signal is determined by comparing the sample index $n_s$ with the transient point $N_T P$ of the modulated signal at step S45

If it is determined at step S45 that the location of the current sample index $n_s$ corresponds to a point before the transient point $N_T P$ of the modulated signal, the modulated signal $S_{VPPM\_TX}$ is output based on the relationship of being inverted with respect to the transmission signal, that is, $S_{VPPM\_TX}=\text{not}(D_{rx})$, at step S50

In contrast, if it is determined at step S45 that the location of the current sample index $n_s$ corresponds to a point after the transient point $N_T P$ of the modulated signal, the modulated signal $S_{VPPM\_TX}$ is output based on the relationship of being identical to the transmission signal, that is, $S_{VPPM\_TX}=D_{TX}$, at step S55

Thereafter, it is determined whether the process of transmitting the transmission signal has been completed at step S60. If it is determined that the process of transmitting the transmission signal has been completed, the overall process is terminated. In contrast, if it is determined that the process of transmitting the transmission signal has not been completed, the sample index $n_s$ is increased by an increment and then set as a sample index for a subsequent sample and steps S10 to S60 are repeated at step S65.

Meanwhile, the parenthesized expressions inside the blocks of steps S25, S50 and S55 in FIG. 7 correspond to the cases where the relationship between the transmission signal $D_{TX}$ and the modulated signal $S_{VPPM\_TX}$ illustrated in FIG. 6 has been inverted. In other words, when a signal of 110, not 001, is transmitted via the VPPM modulation signal waveform illustrated in FIG. 6, modulation is performed as described by the parenthesized expressions.

Figure 8:
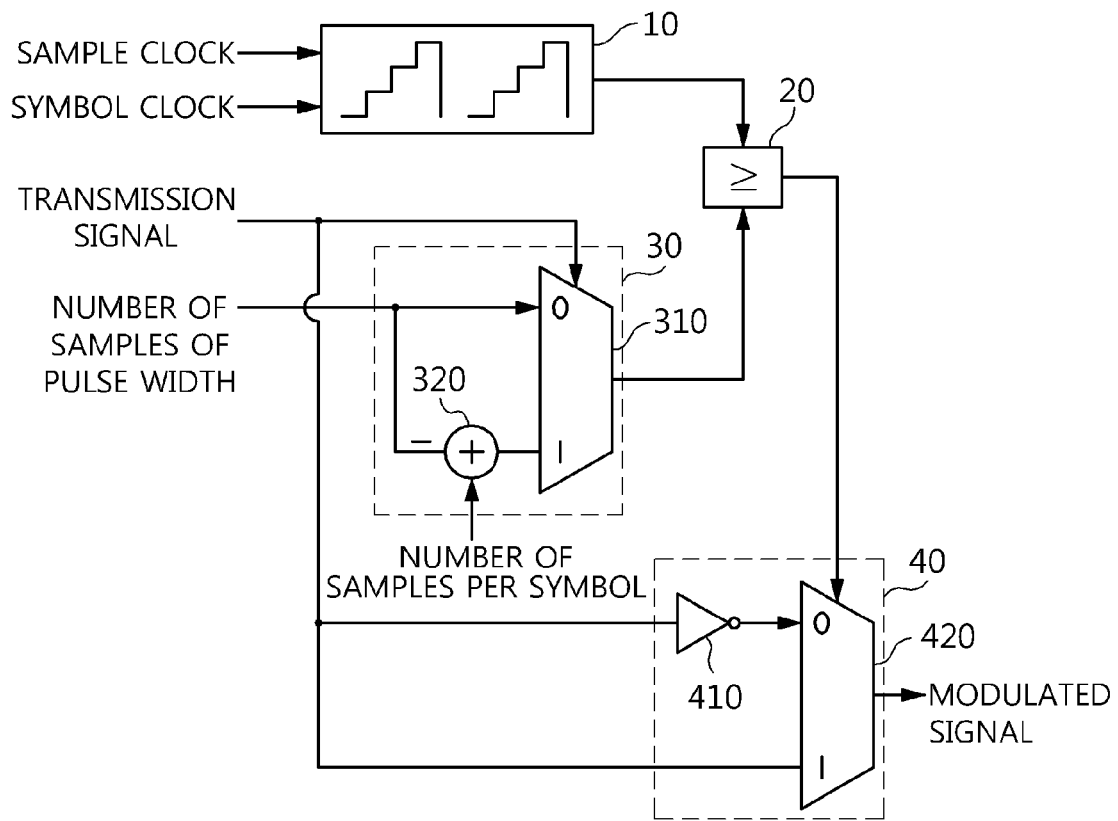
FIG. 8 is a digital circuit-based block diagram illustrating the VPPM modulation of a visible light communication method in accordance with an embodiment of the present invention.

FIG. 8 is a digital circuit-based block diagram illustrating the VPPM modulation of a visible light communication method in accordance with an embodiment of the present invention.

FIG. 8 illustrates the VPPM modulation process of FIG. 7 using a digital circuit-based block diagram.

Referring to FIG. 8, a digital circuit that performs the visible light communication method in accordance with an embodiment of the present invention includes a first counter 10 configured to generate a sample index, a first comparator 20 configured to compare the sample index with the transient point of a modulated signal, a transient point setting unit 30 configured to include a first multiplexer 310 and a subtracter 320 that sets a transient point in accordance with a transmission signal, and a modulated signal determination unit 40 configured to include an inverter 410 and a second multiplexer 420 configured to determine the modulated signal in accordance with a comparison value and the transmission signal.

The first counter 10 receives a sample clock that sets the intervals at which a symbol is sampled, and generates a current sample index by sampling the symbol of the transmission signal at intervals of a predetermined frequency and counting the number of samples within the symbol.

The first counter 10 determines whether a current location is the start of the symbol by receiving a symbol clock synchronized with the symbol of the transmission signal and comparing the symbol clock with the symbol of the transmission signal. In this case, if the start of the symbol is indicated by the symbol clock, the sample index is reset to 0.

The transient point setting unit 30 generates the transient point of the transmission signal using the number of samples of the pulse width of the transmission signal and the number of samples per symbol based on the transmission signal.

The subtracter 320 calculates the difference between the number of samples of the pulse width of the transmission signal and the number of samples per symbol, and the first multiplexer 310 transfers a value selected from between the difference calculated by the subtracter 320 and the number of samples of the pulse width of the transmission signal to the comparator 20.

The first comparator 20 determines whether the current sample index corresponds to a point before or after the transient point of the modulated signal by comparing the sample index with the transient point of the modulated signal.

The modulated signal determination unit 40 determines the modulated signal in accordance with the comparison value of the first comparator 20 and the transmission signal.

The inverter 410 performs an inverting operation on the value of the transmission signal, and the second multiplexer 420 selectively outputs the modulated signal in accordance with the comparison value of the first comparator 20.

Figure 9:
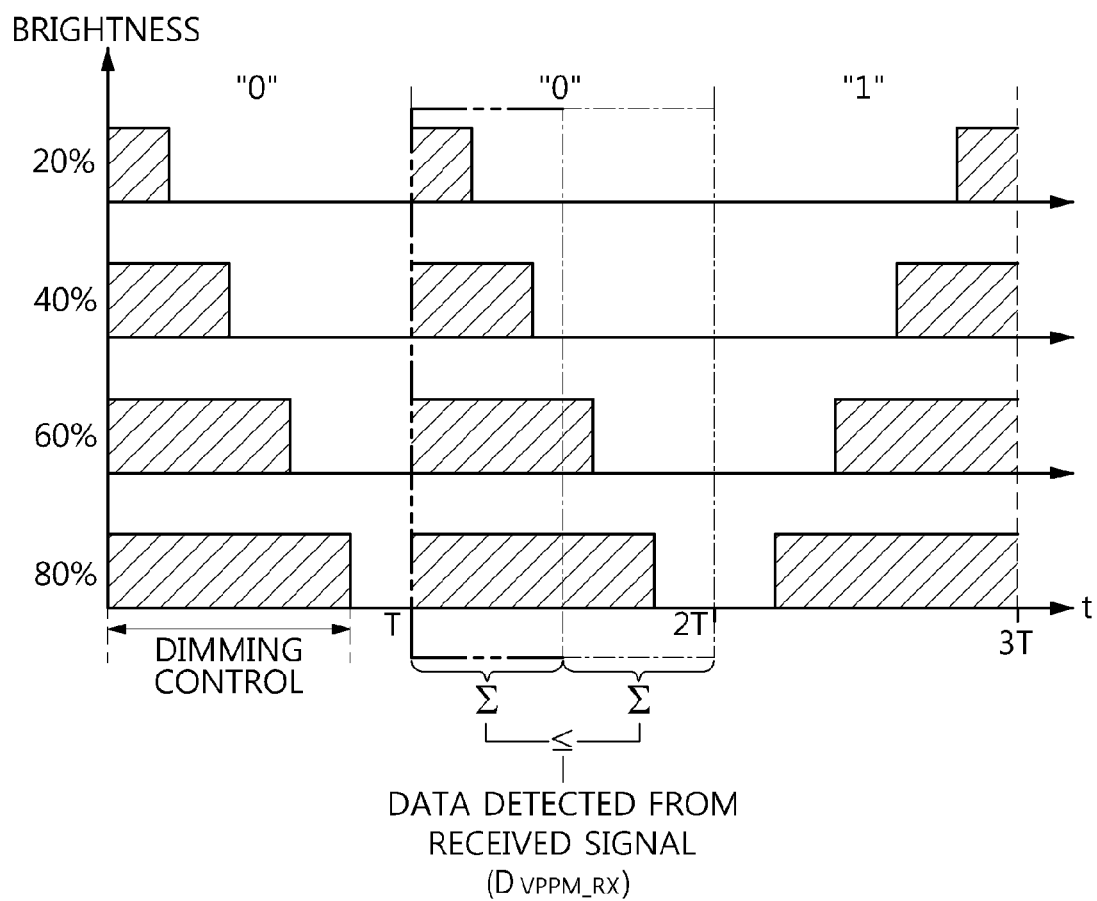
FIG. 9 is a diagram illustrating the VPPM demodulation of a visible light communication method in accordance with an embodiment of the present invention.

FIG. 9 is a diagram illustrating the VPPM demodulation of a visible light communication method in accordance with an embodiment of the present invention.

Since VPPM modulation is basically a method of carrying transmission data at a location inside a symbol of a pulse, data transmitted from a transmitter can be detected by determining whether received pulse energy is detected in the front or rear portion of a received symbol.

Since whether a pulse has been detected in the corresponding portion is the same as whether pulse energy has been detected, the determination may be performed using a received signal accumulator for the front portion and a received signal accumulator for the rear portion. Thereafter, the demodulated signal $D_{VPPM\_RX}$ of the received signal can be obtained by comparing energy values accumulated by the two signal accumulators.

Figure 10:
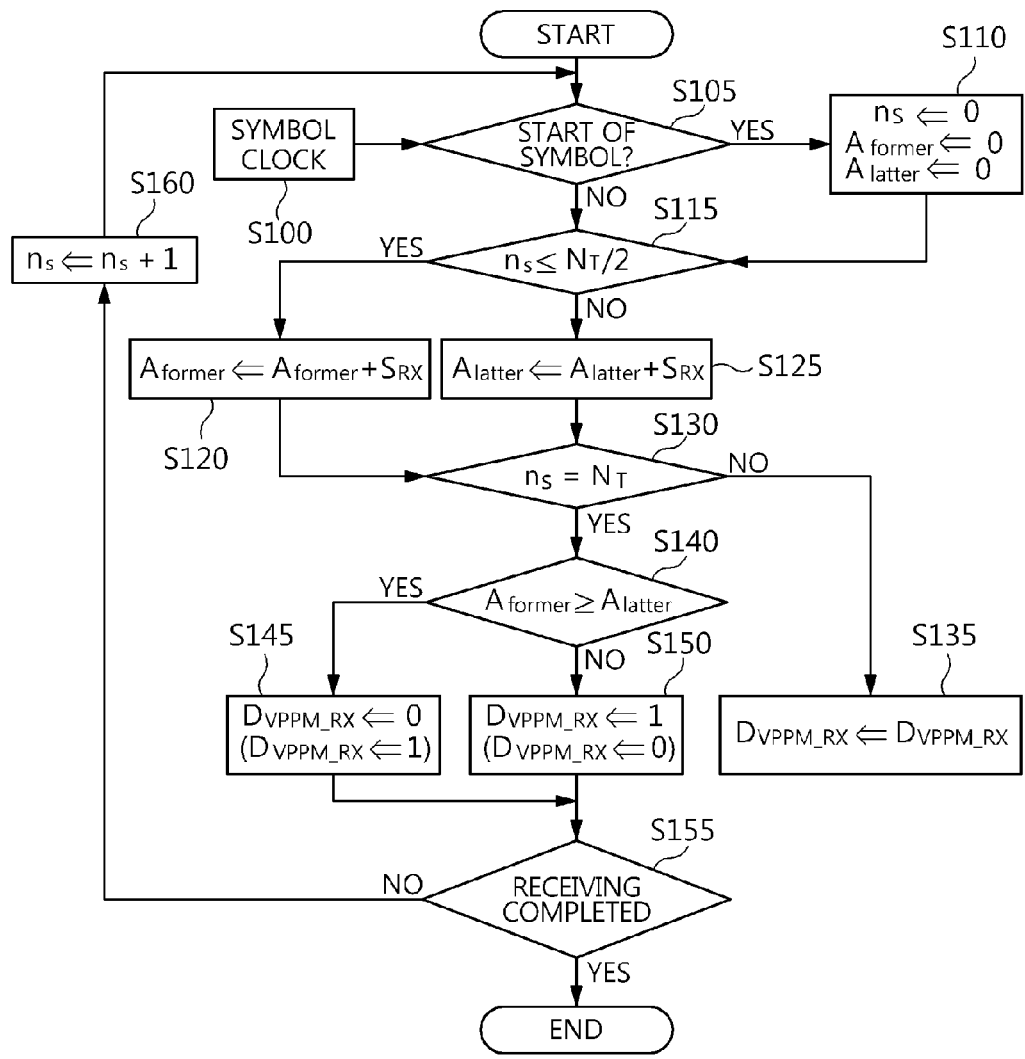
FIG. 10 is a flowchart illustrating the signal processing of the VPPM demodulation of a visible light communication method in accordance with an embodiment of the present invention.

FIG. 10 is a flowchart illustrating the signal processing of the VPPM demodulation of a visible light communication method in accordance with an embodiment of the present invention.

FIG. 10 illustrates the flow of a signal processing process of, when the received signal $D_{RX}$ is 001, generating the VPPM demodulated signal $S_{VPPM\_RX}$ corresponding to the dimming control signal $Dim_{per}$ (or $N_D$) and the received signal DRX while taking into consideration sampling and the counter, with respect to the VPPM demodulation waveform illustrated in FIG. 9.

Referring to FIG. 10, in the visible light communication method in accordance with an embodiment of the present invention, a symbol clock synchronized with a received signal is input at step S100, and whether a current location corresponds to the start of a corresponding symbol is determined by comparing the symbol clock synchronized with the received signal and the symbol being sampled based on the synchronized symbol clock at step S105.

Here, the symbol clock synchronization of the reception unit may be performed using a timing synchronization circuit or a clock recovery circuit.

Thereafter, if it is determined that the current location corresponds to the start of the symbol, a sample index $n_s$, an accumulated value $A_{former}$ for the front half portion of the symbol, and an accumulated value $A_{latter}$ for the rear half portion of the symbol are reset to 0 at step S110

In contrast, if it is determined that the current location corresponds to the midpoint of the symbol, the sample index $n_s$, the accumulated value $A_{former}$ for the front half portion of the symbol, and the accumulated value $A_{latter}$ for the rear half portion of the symbol are maintained without change.

Thereafter, whether the location of the sample index $n_s$ belongs to the front half portion or rear half portion of the inside of the symbol is determined by comparing the sample index $n_s$ with the midpoint of the symbol at step S115.

If the sample index $n_s$ corresponds to the front portion, a currently received signal value $S_{RX}$ is classified as the signal accumulated value for the front half portion of the inside of the symbol and then added thereto at step S120. In contrast, if the sample index $n_s$ corresponds to the rear portion, the currently received signal value $S_{RX}$ is classified as a signal accumulated value for the rear half portion of the inside of the symbol and then added thereto at step S125.

Thereafter, whether the current location corresponds to the end of the symbol is determined by comparing the sample index $n_s$ and a per-symbol sample index $N_T$ at step S130.

If the sample index $n_s$ is different from the per-symbol sample index $N_T$, it is determined that the current location does not correspond to the end of the symbol, and the demodulated signal $D_{VPPM\_RX}$ is maintained without change at step S135.

In contrast, if the sample index $n_s$ is the same as the per-symbol sample index $N_T$, the accumulated value $A_{former}$ for the front half portion of the symbol and the accumulated value $A_{latter}$ for the rear half portion of the symbol obtained at steps S120 and S125 are compared with each other and then a modulated signal $D_{VPPM\_RX}$ is output at step S140

Here, if it is determined that the accumulated value $A_{former}$ for the front half portion of the symbol is equal to or larger than the accumulated value $A_{latter}$ for the rear half portion of the symbol, the modulated signal $D_{VPPM\_RX}$ is output as 0 at step S145. In contrast, if it is determined that the accumulated value $A_{former}$ for the front half portion of the symbol is smaller than the accumulated value $A_{latter}$ for the rear half portion of the symbol, the modulated signal $D_{VPPM\_RX}$ is output as 1 at step S150.

Thereafter, it is determined whether the process of receiving the transmission signal has been completed at step S155. If it is determined that the process of receiving the transmission signal has been completed, the overall process is terminated. In contrast, if it is determined that the process of receiving the transmission signal has not been completed, the sample index $n_s$ is increased by an increment and then set as a sample index for a subsequent sample and steps S100 to S155 are repeated at step S160.

Meanwhile, the symbol of the demodulated signal $D_{VPPM\_RX}$ is delayed by at least one symbol compared with the symbol of the received signal $S_{RX}$, the reason for which is that the detection of the demodulated signal $D_{VPPM\_RX}$ is performed at the end of the symbol of the corresponding received signal $S_{RX}$ at the earliest.

Meanwhile, the parenthesized expressions inside the blocks of steps S145 and S150 in FIG. 10 correspond to the cases where the relationship between the transmission signal $D_{TX}$ and the modulated signal $S_{VPPM\_TX}$ illustrated in FIG. 6 has been inverted. In other words, when a signal of 110, not 001, is transmitted via the VPPM modulation signal waveform illustrated in FIG. 9, demodulation is performed as described by the parenthesized expressions.

Figure 11:
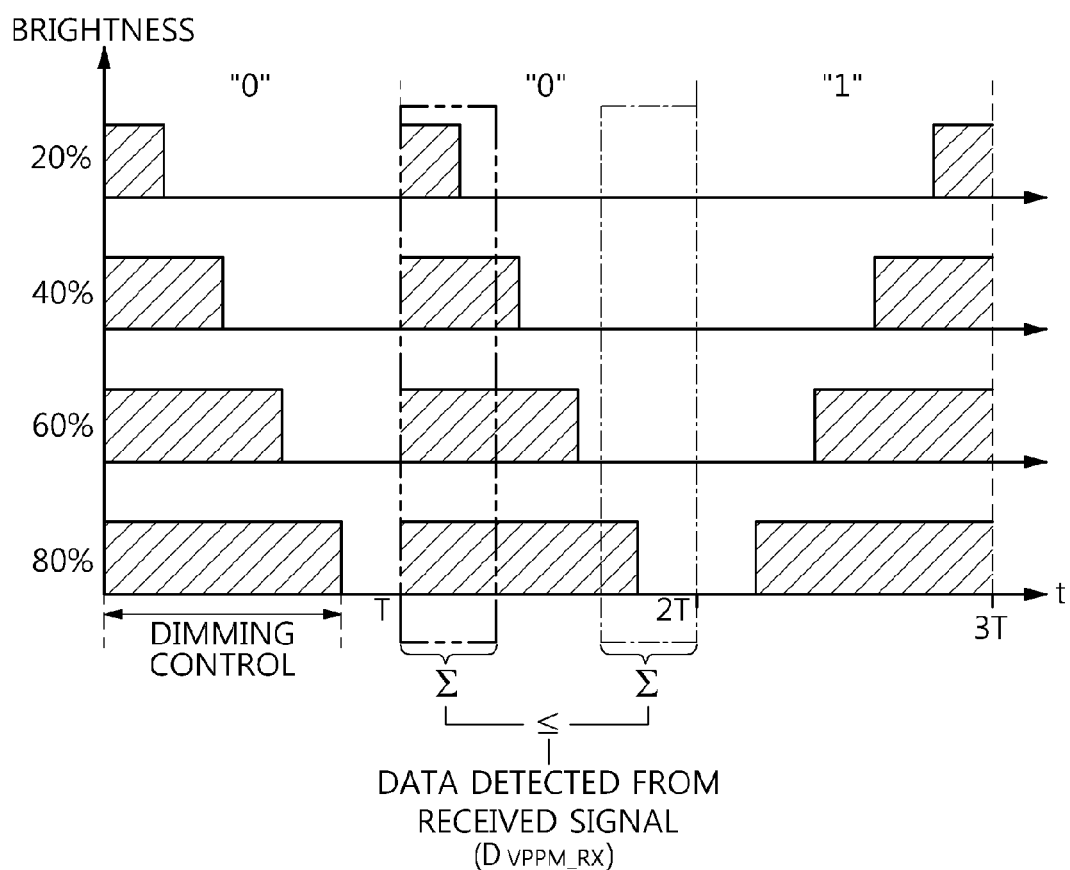
FIG. 11 is a diagram illustrating the VPPM demodulation of a visible light communication method, in which accumulation regions have been set in order to mitigate interference, in accordance with an embodiment of the present invention.

FIG. 11 is a diagram illustrating the VPPM demodulation of a visible light communication method, in which accumulation regions have been set in order to mitigate interference, in accordance with an embodiment of the present invention.

The demodulation method illustrated in FIG. 10 is a method of detecting received data by determining the location of energy corresponding to a pulse signal, and can demodulate a 2-PPM modulated signal that carries information at the locations of pulses.

However, the VPPM modulated signal has pulses that are variable depending on a dimming control signal, unlike the 2-PPM modulated signal. As a result, a reception performance reduction phenomenon that does not occur in 2-PPM transmission and reception occurs. As can be seen from FIG. 9, with respect to the dimming control signal corresponding to 50% or more of the symbol length, the pulse of the front portion of the symbol affects the rear portion of the symbol, and the pulse of the rear portion of the symbol affects the front portion of the symbol.

In other words, the energy of a pulse carrying a transmission signal at the location of a symbol that does not corresponding to transmission data is received, which may cause interference.

In order to prevent such an interference phenomenon, the process of excluding a pulse signal in a portion where interference may occur in the detecting process is required. This can be achieved by detecting pulse energy only in a specific front portion of the symbol and only in a specific rear portion of the symbol, rather than detecting pulse energy in the overall front portion of the symbol and in the overall rear portion of the symbol. That is, it can be achieved by setting accumulation regions having the same width for a pulse before and after the symbol, respectively.

Figure 12:
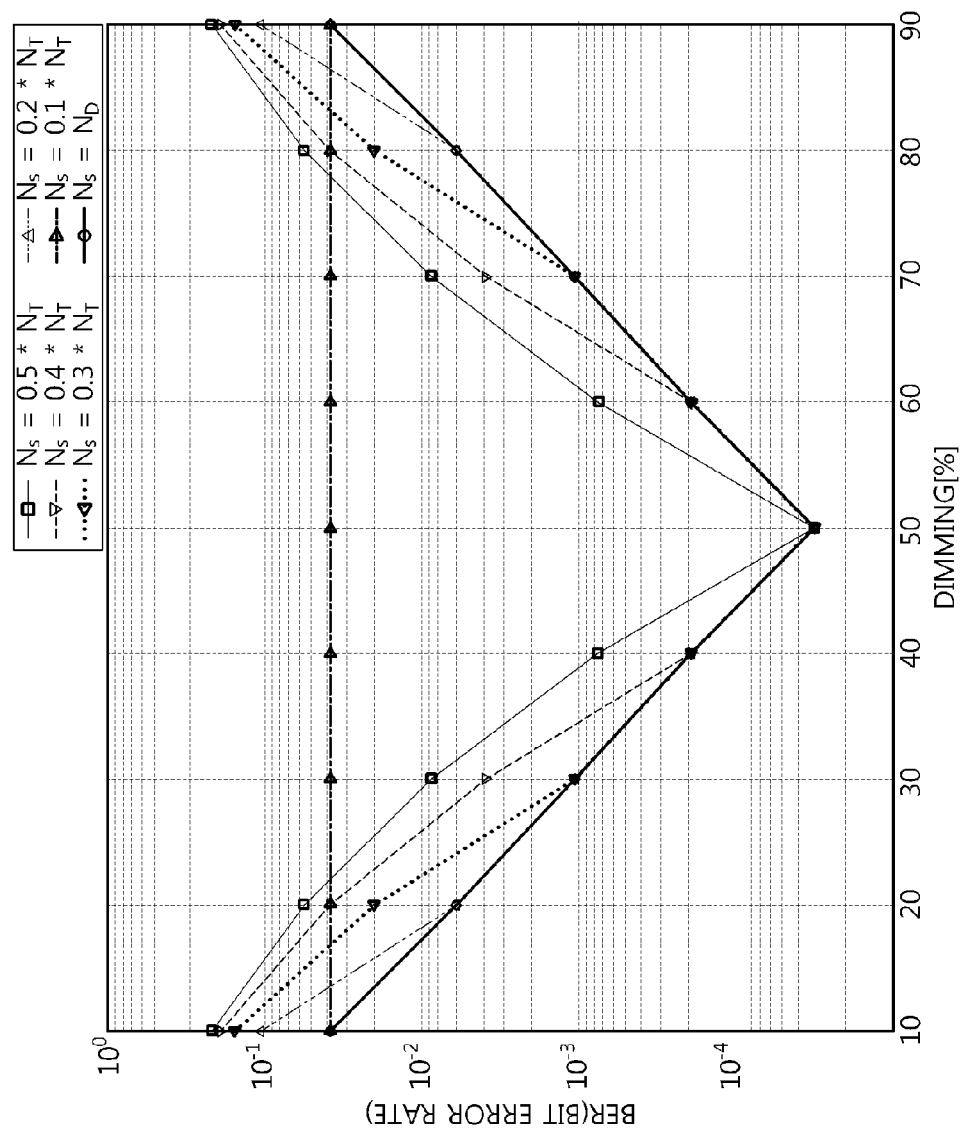
FIG. 12 is a diagram illustrating the BER performance simulation results of the VPPM demodulation of a visible light communication method, in which accumulation regions have been set, in accordance with an embodiment of the present invention.

FIG. 12 is a diagram illustrating the BER performance simulation results of the VPPM demodulation of a visible light communication method, in which accumulation regions have been set, in accordance with an embodiment of the present invention.

Referring to FIG. 12, the bit-error rate (BER) performance simulation results of the VPPM demodulation in which accumulation regions have been set at a signal-to-noise ratio (SNR) of 8 dB with respect to a sample signal can be seen.

Here, $N_s$ is the number of received signal samples that are accumulated in order to detect pulse energy.

Therefore, the case where $N_s$ is half of the number of samples per symbol $N_T$ ($N_s=N_T/2$) corresponds to a general demodulation method illustrated in FIGS. 9 and 10. The reason why in the case of a general demodulation method ($N_s=N_T/2$), the BER performance is low at a dimming control value less than 50% is that the energy of a transmission signal is low because the width of a pulse is narrow.

Meanwhile, the reason why the BER performance is low at a dimming control value equal to or higher than 50%, at which the energy of a transmission signal is relatively high because the width of a pulse is wide, is that pulse interference occurs between time regions before and after a symbol.

From FIG. 12, it can be seen that, as the dimming control value increases, the pulse interference further increases, and thus the performance further decreases.

Furthermore, FIG. 12 shows that the general demodulation method exhibits high reception performance at an intermediate dimming control value around 50% while the demodulation method in which specific accumulation regions have been set exhibits high reception performance at a small or large dimming control value.

The highest VPPM demodulation performance can be achieved using a demodulation method ($N_s=N_D$) in which accumulation regions are variable depending on the pulse width of a received signal.

Figure 13:
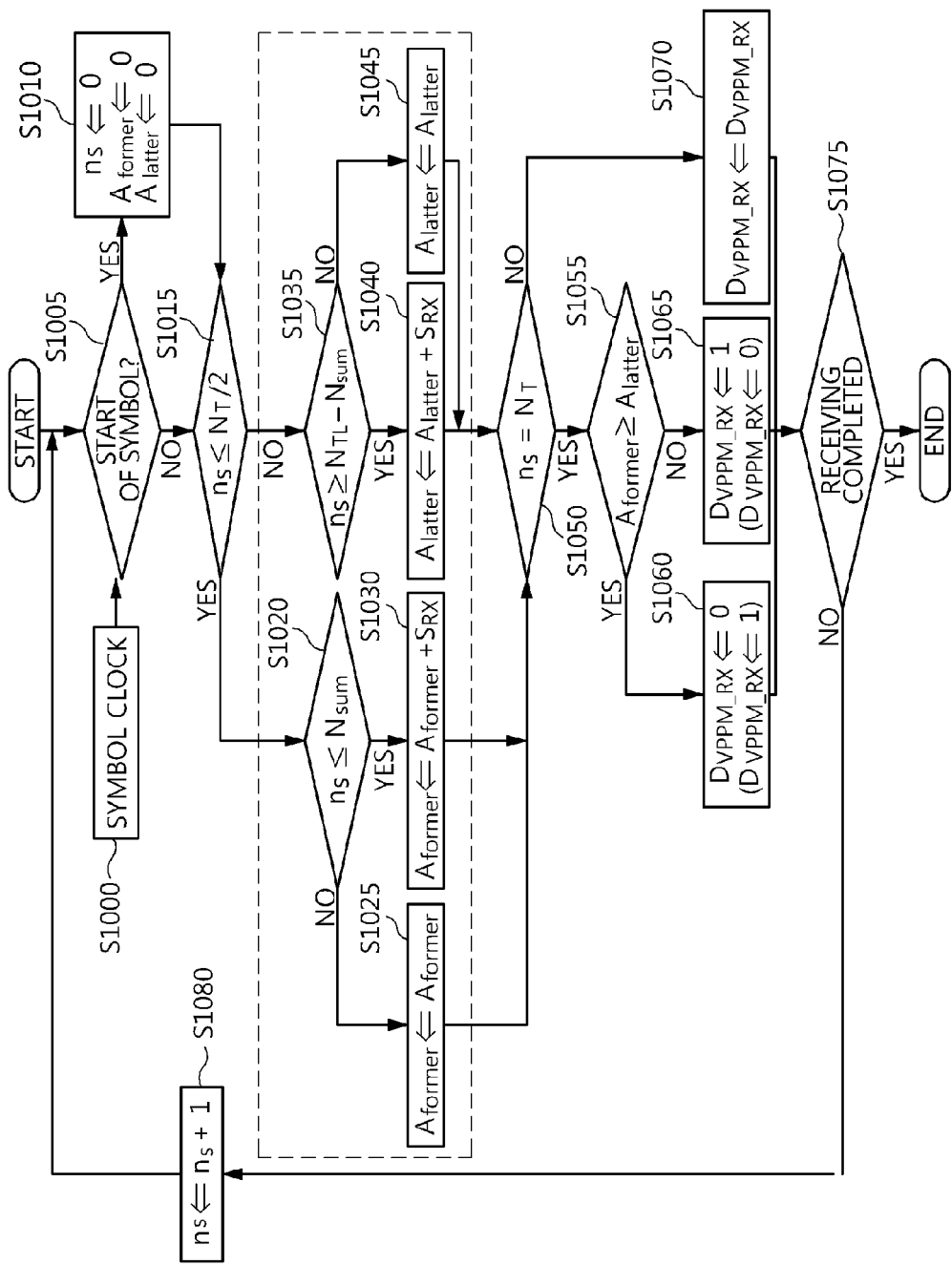
FIG. 13 is a flowchart illustrating the signal processing of the VPPM demodulation of a visible light communication method, in which accumulation regions can be set in order to mitigate interference, in accordance with an embodiment of the present invention.

FIG. 13 is a flowchart illustrating the signal processing of the VPPM demodulation of a visible light communication method, in which accumulation regions can be set in order to mitigate interference, in accordance with an embodiment of the present invention.

In the flowchart of signal processing illustrated in FIG. 13, blocks for determining whether a current location corresponds to an accumulation region and accumulation blocks for performing accumulation depending on the results of the determination are added to the flowchart of the signal processing of VPPM demodulation illustrated in FIG. 10, and thus the detection of received pulse energy restricted only to accumulation regions is enabled. That is, a dotted line box circumscribes the added blocks.

Referring to FIG. 13, in the visible light communication method in accordance with this embodiment of the present invention, a symbol clock synchronized with a received signal is input at step S1000, and whether a current location corresponds to the start of a corresponding symbol is determined by comparing the symbol clock synchronized with the received signal with the symbol being sampled based on the symbol clock synchronized with the received signal at step S1005.

In this case, at step S1000, a sample clock that is used to distinguish a sample index may be input along with the symbol clock.

Thereafter, if it is determined that the current location corresponds to the start of the symbol, a sample index $n_s$, an accumulated value $A_{former}$ for the front half portion of the symbol, and an accumulated value $A_{latter}$ for the rear half portion of the symbol are reset to 0 at step S1010

In contrast, if it is determined that the current location corresponds to the midpoint of the symbol, the sample index $n_s$, the accumulated value $A_{former}$ for the front half portion of the symbol, and the accumulated value $A_{latter}$ for the rear half portion of the symbol are maintained without change.

Thereafter, whether the location of the sample index $n_s$ belongs to the front or rear half portion of the inside of the symbol is determined by comparing the sample index $n_s$ with the midpoint of the symbol at step S1015.

If the sample index $n_s$ corresponds to the front portion, classification as the sample index $n_s$ and the signal accumulated value for the front half portion of the inside of the symbol is performed.

Thereafter, whether to perform accumulation is determined by comparing the sample index $n_s$ with the number of accumulated samples $N_s$ of the front half portion at step S1020.

If it is determined that the sample index $n_s$ is larger than the number of accumulated samples $N_s$ of the front half portion, the accumulated value $A_{former}$ for the front half portion of the symbol is maintained without change at step S1025. In contrast, if it is determined that the sample index $n_s$ is equal to or smaller than the number of accumulated samples $N_{sum}$ of the front half portion, a received signal value $S_{RX}$ is added to the accumulated value $A_{former}$ for the front portion of the symbol at step S1030.

In contrast, if the sample index $n_s$ corresponds to the rear portion at step S1015, classification as the sample index $n_s$ and the signal accumulated value for the rear half portion of the inside of the symbol is performed.

Thereafter, whether to perform accumulation is determined by comparing the sample index $n_s$ with the number of accumulated samples $N_T L - N_{sum}$ of the rear half portion at step S1035.

If it is determined that the sample index $n_s$ is equal to or larger than the number of accumulated samples $N_T L - N_{sum}$ of the rear half portion, the received signal value $S_{RX}$ is added to the accumulated value $A_{latter}$ for the rear half portion of the symbol at step S1040. In contrast, if it is determined that the sample index $n_s$ is smaller than the number of accumulated samples $N_T L - N_{sum}$ of the rear half portion, the accumulated value $A_{latter}$ for the rear half portion of the symbol is maintained without change at step S1045.

Thereafter, whether a current location corresponds to the end of the symbol is determined by comparing the sample index $n_s$ with the per-symbol sample index $N_T$ at step S1050

If the sample index $n_s$ is different from the per-symbol sample index $N_T$, it is determined that the current location does not correspond to the end of the symbol, and then the demodulated signal $D_{VPPM\_RX}$ is maintained without change at step S1070.

In contrast, if the sample index $n_s$ is the same as the per-symbol sample index $N_T$, the modulated signal $D_{VPPM\_RX}$ is output by comparing the accumulated value $A_{former}$ for the front half portion of the symbol with the accumulated value $A_{latter}$ for the rear half portion of the symbol accumulated at steps S1030 and S1040, at step S1055.

In this case, if it is determined that the accumulated value $A_{former}$ for the front half portion of the symbol is equal to or larger than the accumulated value $A_{latter}$ for the rear half portion of the symbol, the modulated signal $D_{VPPM\_RX}$ is output as 0 at step S1060. In contrast, if it is determined that the accumulated value $A_{former}$ for the front half portion of the symbol is smaller than the accumulated value $A_{latter}$ for the rear half portion of the symbol, modulated signal $D_{VPPM\_RX}$ is output as 1 at step S1065.

Thereafter, whether the process of receiving the transmission signal has been completed is determined at step S1075. If it is determined that the process has been completed, the overall process is terminated. In contrast, if it is determined that the process has not been completed, the sample index $n_s$ is increased by an increment and then set as a sample index for a subsequent sample, and steps S1000 to S1075 are repeated at step S1080.

Meanwhile, the parenthesized expressions inside the blocks of steps S1060 and S1065 in FIG. 13 correspond to the cases where the relationship between the transmission signal $D_{TX}$ and the modulated signal $S_{VPPM\_TX}$ illustrated in FIG. 6 has been inverted. In other words, when a signal of 110, not 001, is transmitted via the VPPM modulation signal waveform illustrated in FIG. 9, demodulation is performed as described by the parenthesized expressions.

Figure 14:
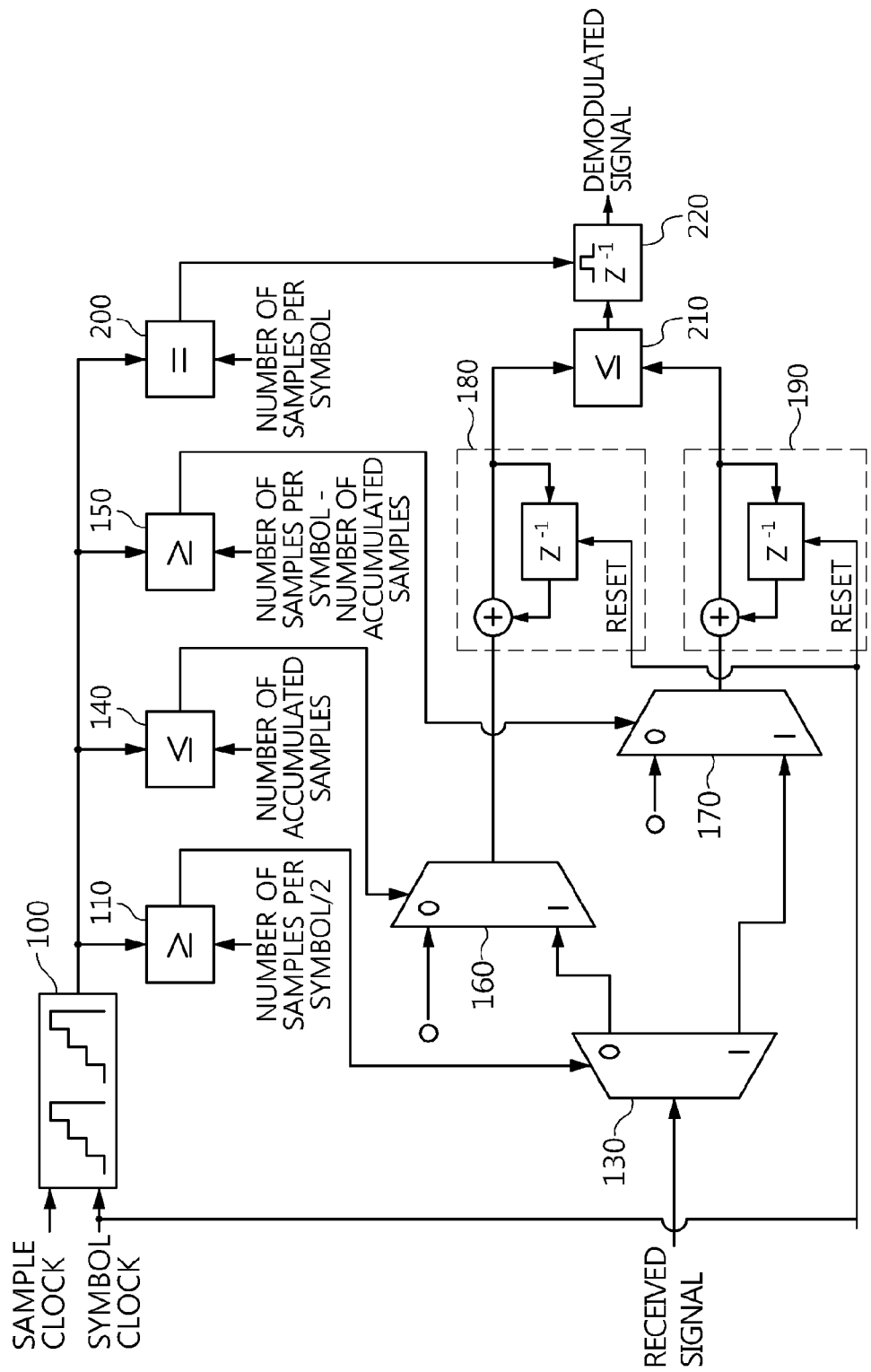
FIG. 14 is a digital circuit-based block diagram of the VPPM demodulation of a visible light communication method in which accumulation regions have been set in order to mitigate interference, in accordance with an embodiment of the present invention.

FIG. 14 is a digital circuit-based block diagram of the VPPM demodulation of a visible light communication method in which accumulation regions have been set in order to mitigate interference, in accordance with an embodiment of the present invention.

FIG. 14 illustrates the VPPM demodulation process of FIG. 13 using a digital circuit-based block diagram.

Referring to FIG. 14, a digital circuit for performing a visible light communication method in accordance with an embodiment of the present invention includes a second counter 100, a second comparator 110, a demultiplexer 130, a third comparator 140, a fourth comparator 150, a first accumulator 180, a second accumulator 190, a fifth comparator 210, a sixth comparator 200, and a register 220.

The second counter 100 receives a sample clock used to set the intervals at which a symbol is sampled, generates a sample index in accordance with the sample clock, receives a symbol clock synchronized with a symbol of a transmission signal, and determines whether a current location corresponds to the start of the symbol by comparing the symbol clock with the symbol of the transmission signal. In this case, if the start of the symbol is indicated by the symbol clock, the sample index is reset to 0.

The second comparator 110 compares the sample index $n_s$ with half of the number of samples per symbol in order to distinguish a time region before or after the symbol.

The demultiplexer 130 distributes the received signal to a corresponding one of the accumulators 180 and 190 for time regions before and after the symbol based on the comparison results of the comparator 110.

The third and fourth comparators 140 and 150 determine the accumulation regions by comparing the numbers of accumulated samples related to the accumulation regions with the sample index.

The first and second accumulators 180 and 190 accumulate pulse signals for the regions before and after the symbol.

In this case, the first and second accumulators 180 and 190 may be reset for each symbol in response to the symbol clock input to the second counter 100. Accordingly, the reset symbol performs the accumulation of a received signal for a new symbol.

The present invention enables VPPM modulation technology to be implemented as a digital circuit capable of transmitting signals without errors while taking into consideration sampling and a counter.

Furthermore, the present invention enables VPPM modulation technology to be implemented as a digital circuit capable of receiving signals without interference between signals while taking into consideration sampling and a counter.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A visible light communication method, comprising:
   determining whether a current location is a start of a symbol of a transmission signal by comparing the symbol of the transmission signal with a symbol clock synchronized with the symbol;
   setting a sample index, indicative of a sequential position number of each of samples obtained by sampling the symbol of the transmission signal at intervals of a predetermined frequency, a signal accumulated value for an accumulation region of a front half portion of the symbol, and a signal accumulated value for an accumulation region of a rear half portion of the symbol, based on results of the determination of whether the current location is the start of the symbol of the transmission signal;

determining whether the sample index belongs to an accumulation region of the front or rear half portion of the symbol by comparing the sample index with a midpoint of the symbol of the transmission signal, and accumulating samples of the transmission signal in accordance with the location to which the sample index belongs;

determining whether a current location corresponds to an end of the symbol by determining whether the sample index is identical to a per-symbol sample index; and outputting a Variable Pulse Position Modulation (VPPM) communication signal corresponding to the transmission signal based on results of the determination of whether the current location corresponds to the end of the symbol.

2. The visible light communication method of claim 1, wherein the transmission signal is an analog signal that is formed of visible light, and the VPPM communication signal is a digital signal that is formed by demodulating the transmission signal to a value of 0 or 1.

3. The visible light communication method of claim 1, wherein the VPPM communication signal is a double pulse position modulation (2-PPM) signal in which locations of pulses are two in number within the symbol, and the midpoint corresponds to the 2-PPM signal.

4. The visible light communication method of claim 1, further comprising increasing a sequential position number of the sample index and repeating the above steps for a subsequent sample index.

5. The visible light communication method of claim 1, wherein the synchronized symbol clock is obtained via a timing synchronization circuit or a clock recovery circuit.

6. The visible light communication method of claim 1, wherein setting the sample index, the signal accumulated value for the accumulation region of the front half portion of the symbol, and the signal accumulated value for the accumulation region of the rear half portion of the symbol comprises, if it is determined that the current location corresponds to the start of the symbol, the sample index, the signal accumulated value for the accumulation region of the front half portion of the symbol, and the signal accumulated value for the accumulation region of the rear half portion of the symbol are reset to 0.

7. The visible light communication method of claim 1, wherein outputting the VPPM communication signal corresponding to the transmission signal based on the results of the determination of whether the current location corresponds to the end of the symbol comprises, if it is determined the current location corresponds to the end of the symbol, comparing the signal accumulated value for the front half portion of the inside of the symbol with the signal accumulated value for the rear half portion of the inside of the symbol, and outputting the VPPM communication signal.

8. The visible light communication method of claim 1, wherein a symbol of the VPPM communication signal is delayed by at least one symbol compared with the symbol of the transmission signal.

9. The visible light communication method of claim 1, wherein determining whether the sample index belongs to the accumulation region of the front or rear half portion of the symbol by comparing the sample index with the midpoint of the symbol of the transmission signal, and accumulating the samples of the transmission signal in accordance with the location to which the sample index belongs comprises:

selecting one of the accumulation region for the front half portion of an inside of the symbol and the accumulation region for the rear half portion of the inside of the symbol by comparing the sample index with the midpoint of the symbol;

determining whether to perform accumulation by comparing the sample index with a number of accumulated samples of the selected accumulation region; and accumulating a received signal depending on results of the determination.

10. The visible light communication method of claim 9, wherein a width of the accumulation region of the front or rear half portion of the inside of the symbol is set to a value smaller than half of the symbol, and only specific front and rear portions of the symbol of the transmission signal are accumulated.

11. A visible light communication apparatus, comprising:
a counter configured to generate samples by sampling a transmission signal at intervals of a predetermined frequency, and to generate a sample index indicative of a sequential position number of a current one of the samples;

a transient point setting unit configured to set a transient point of a modulated signal sample, indicating a sample index at which a value of the transmission signal varies;

a first comparator configured to determine whether the sample index belongs to a front or rear half portion of a symbol of the transmission signal;

a first accumulator configured to accumulate a transmission signal of the front half portion of the symbol;

a second accumulator configured to accumulate a transmission signal of the rear half portion of the symbol;

a demultiplexer configured to distribute the transmission signal to the first accumulator or second accumulator in accordance with comparison results of the first comparator; and a communication signal determination unit configured to determine a VPPM communication signal of the transmission signal by comparing magnitudes of the transmission signals accumulated in the first and second accumulators.

12. The visible light communication apparatus of claim 11, wherein the counter increases a sequential position number of the sample index, and transfers the increased sequential position number to the comparator.

13. The visible light communication apparatus of claim 11, wherein the first comparator determines whether the sample index belongs to a front or rear half portion of the symbol by comparing the sample index with half of a number of per-symbol samples of the transmission signal.

14. The visible light communication apparatus of claim 11, further comprising:
a second comparator configured to determine whether a current location corresponds to an end of the symbol by determining whether the sample index is identical to a per-symbol sample index of the transmission signal;
wherein the communication signal determination unit outputs the VPPM communication signal if the second comparator determines that the current location corresponds to the end of the symbol.

15. The visible light communication apparatus of claim 11, further comprising:
a second comparator configured to select one of front and rear half portions of an inside of the symbol as a portion where the transmission signal will be accumulated by comparing the sample index with a midpoint of the symbol; and a third comparator configured to determine whether to perform accumulation by comparing the sample index with a number of accumulated samples of the portion where the transmission signal will be accumulated.

16. The visible light communication apparatus of claim 11, wherein a width of an accumulation region of the front or rear half portion of an inside of the symbol is set to a value smaller than half of the symbol, and only specific front and rear portions of the symbol of the transmission signal are accumulated.

* * * * *